March 16, 1954
R. O. WALTON
2,672,159
STRAIGHT LINE CHOKE VALVE
Filed Nov. 5, 1948
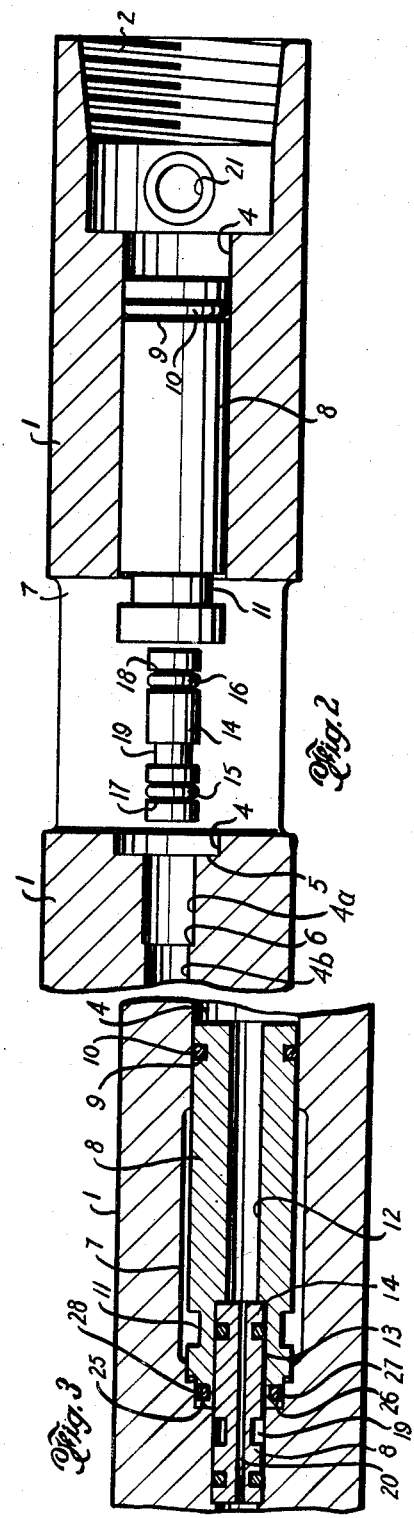
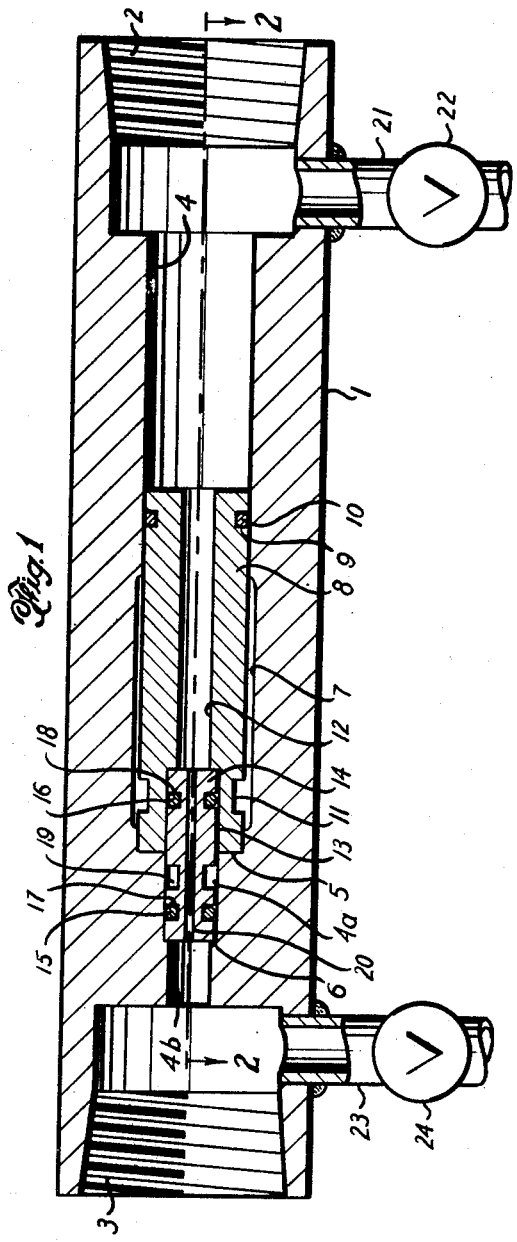
Robert O. Walton
INVENTOR.
BY
*R. C. Werlin*
ATTORNEY Patented Mar. 16, 1954

2,672,159

UNITED STATES PATENT OFFICE 2,672,159

STRAIGHT LINE CHOKE VALVE

Robert O. Walton, Corpus Christi, Tex.

Application November 5, 1948, Serial No. 58,560

5 Claims. (Cl. 138—44)

This invention relates to choke valves such as are employed for regulating the flow of fluid through pipes.

Choke valves conventionally are used in flow lines from oil or gas wells for restricting the flow of such fluids in order to control the rate of discharge of fluids from a well and to regulate the gas-oil ratio from producing wells. Such a choke valve, which comprises a flow restricting orifice, is commonly of fixed area and when necessary to change the rate of discharge or flow of the fluid, a choke element of a different orifice size must be installed in the flow line. Also the choke elements must often be replaced when cutting or erosion occurs due to the high velocities commonly experienced when used in flow lines conducting fluids at high pressure. Conventionally choke elements are installed in T-type bodies in one of the branches of the cross member of the T-structure and, therefore, at a right angle to the flow of fluid which ordinarily enters through the center leg of the T. This is done in order to render the choke accessible for removal through the opposite branch of the T without the necessity of disconnecting the flow line. However, this has the disadvantage that serious erosion of the fittings may occur at the point where the fluid changes direction. Also conventional choke elements are ordinarily installed in the valve body by screwing them into threaded connections or by the use of the various types of screw fittings in the body, all of which involve considerable difficulty and effort when necessary to remove or replace the choke, or to substitute one of a different size.

The present invention has for its principal object the provision of a straight line choke valve which may be installed directly in the line of fluid flow in a flow line carrying the fluid and in which the choke element may be very simply and easily removed or replaced with a minimum of effort and loss of time.

An important object of the present invention is to provide a simplified form of choke valve in which the choke element is installed in the line of fluid flow without the use of any threaded connections in a relatively simple form of valve body.

Another important object of this invention is to provide a simplified form of choke valve in which the choke element may be installed and removed from its supporting body, ordinarily by the mere use of the hands of the operator, and with a minimum of physical effort or mechanical assistance.

Other and more specific objects and advantages of this invention will become apparent from the following detailed description when read in conjunction with the accompanying drawings, which illustrate useful embodiments in accordance with this invention;

In the drawings:

Fig. 1 is a longitudinal sectional view of a choke valve in accordance with this invention;

Fig. 2 is a partly sectional longitudinal view taken along line 2—2 of Fig. 1 illustrating the manner in which the choke element may be installed in or removed from the valve body; and Fig. 3 is a fragmentary sectional view of another embodiment of a choke valve in accordance with this invention.

Referring to the drawings, the device, in accordance with one embodiment of this invention, consists of an elongated cylindrical body 1 which is provided at its right and left hand ends with threaded boxes 2 and 3, respectively, by means of which the body may be installed co-axially in a flow line carrying the fluid to be regulated or controlled by the valve, the right hand end being the up-stream side of the device, as indicated by the arrow in Fig. 1.

A generally cylindrical bore 4 extends axially through body 1 between boxes 2 and 3 providing communication therebetween. At a point suitably spaced from the down-stream end of body 1, the diameter of bore 4 is reduced in a portion 4a, forming an annular shoulder 5. Reduced diameter bore portion 4a extends for a portion of the remaining distance toward the down-stream end of the body and is further reduced somewhat to form a second annular shoulder 6, intermediate shoulder 5 and box 3, the further reduced portion of the bore extending to box 3 being designated portion 4b. A slot or opening 7, of somewhat greater width than the diameter of bore 4, extends diametrically through body 1 and forms a lateral enlargement of bore 4 extending longitudinally up-stream from a point slightly in advance of shoulder 5 to an intermediate point along the bore. A cylindrical retainer 8 of a diameter such as to provide a close sliding fit in bore 4, and having its down-stream end preferably cut square to seat snugly against shoulder 5, is slidably disposed in bore 4 and is of somewhat greater length than slot 7, so that when fully inserted toward shoulder 5, its opposite ends will longitudinally span slot 7. The periphery of retainer 8 is provided with a circular groove 9 about its up-stream end portion, and a compressible sealing ring 10, such as a conventional O-ring, is disposed in groove 9 to form a slidable fluid-tight seal between retainer 8 and bore 4 up-stream of slot 7. At an intermediate point along the exterior surface of retainer 8, preferably near its down-stream end, a groove 11, or other suitable form of depression, is provided to form means for gripping the retainer through slot 7. Retainer 8 has an axial bore 12 extending from its up-stream end to a point spaced from its opposite end where bore 12 is enlarged in diameter to approximately that of bore portion 4a, to form a cylindrical socket 13 registering with bore portion 4a. Slidably seated in socket 13 is a cylindrical choke element 14 of a length such that when its up-stream end rests against the bottom of socket 13, its opposite end will extend from socket 13 into bore portion 4a and against shoulder 6 when retainer 8 has attained its maximum travel in the down-stream direction. Compressible sealing rings 15 and 16, such as conventional O-rings, are seated in respective grooves 17 and 18 cut in the exterior of choke element 14 and adjacent its ends and are adapted to form fluid-tight seals between the opposite ends of choke element 14 and bore portion 4a and socket 13, respectively. A gripping slot 19 may be provided in the exterior of choke element 14 intermediate its ends. A fluid passageway 20 of restricted diameter extends axially from end-to-end of choke element 14 and provides communication between bore 12 of retainer 8 and bore 4b. A bleed connection 21, fitted with a valve 22, communicates with the interior of box 2 and a similar bleed connection, fitted with a valve 24, communicates with box 3.

The above described device is assembled and operated in the following manner: Retainer 8, which may or may not have choke element 14 initially installed therein, will be inserted into bore 4 through the up-stream end of body 1 and the body will then be installed in a fluid carrying flow line (not shown) coaxially therewith and arranged therein so that fluid will flow through the body in the direction indicated by the arrow on Fig. 1. If choke element 14 is not initially installed in retainer 8, then when the latter is inserted into the body, the choke element may be installed simply by inserting it through slot 7, and with retainer 8 drawn or pushed back toward the up-stream end of the body, is inserted in socket 13. Thereafter by moving retainer 8 in the down-stream direction, the end of choke element 14, protruding from socket 13, will be inserted into bore 4a and the retainer moved in the down-stream direction to bring the choke element snugly into the position between shoulder 6 and the bottom of socket 13, as illustrated in Fig. 1. Bleed valves 22 and 24 will be closed and fluid to be transmitted through the choke valve will be introduced into the up-stream end of the body. The pressure of the fluid acting on the up-stream end of the retainer 8 will force the latter in the down-stream direction and thereby thrust choke element 14 against shoulder 6 thus retaining the latter in its operating position. Seals 19 and 15 will serve to prevent escape of any fluid between the choke element and the retainer and the adjacent walls of the bores in body 1 while seal 16 will prevent the escape of fluid between the choke element and retainer 8. Thus, as long as a positive pressure differential exists across the retainer and choke element in the direction indicated by the arrow, the choke element and retainer will remain in the positions illustrated in Fig. 1 and fluid will pass through bores 4 and 12 thence through passageway 20 into bore 4b and into the down-stream end of the body.

When it is desired to remove choke element 14, or to replace it by one of a different orifice size or by a new one of the same size, should the original one become worn or cut out, the flow of fluid through the body will be cut off by valves (not shown) which are conventionally installed in the flow line above and below body 1, and bleed valves 22 and 24 will be opened to bleed the pressure out of the body. Thereupon an operator may simply reach into slot 7, either with his fingers or by the use of a convenient tool insertible into slot 11, and retract retainer 8 sufficiently to pull the down-stream end of choke element 14 out of bore 4a. The choke element may then be drawn out of socket 13, as indicated in Fig. 2, and a new one inserted in place thereof, whereupon the retainer will be pulled forward until the new choke element enters bore 4a and the device is again ready for the admission of fluid into the up-stream end. It will be evident that the length of slot 7 need be only slightly longer than choke element 14 so as to permit insertion and removal thereof from the slot.

It will be seen that by the above described arrangement a very simple form of straight line choke valve is provided which can be constructed at a minimum of cost and in which the choke element may be replaced very quickly and with a minimum of effort. It will be understood that the various seals may be placed in the wall of the bores rather than in the bodies of the retainer and choke element, as illustrated, although the arrangement illustrated will normally be found to be the more convenient construction.

Fig. 3 illustrates a slightly modified form of the retainer 8 in which the down-stream end, which extends into the portion of body 1 down-stream from the end of slot 7, is reduced somewhat in diameter, as at 25, and the reduced portion provided with a groove 26 in which is seated a compressible sealing ring 27, such as the conventional O-rings previously described. It will be understood that the down-stream end of bore 4 is additionally reduced in diameter to a corresponding size, as at 28. In all other respects the structure will be identical to that previously described. With the construction illustrated in Fig. 3, additional assurance is provided that the pressure against the down-stream end of retainer 8 will be substantially atmospheric at all times and will, therefore, provide the maximum pressure differential in the down-stream direction across retainer 8, to hold the choke element in place in the body.

It will be understood that various changes and alterations may be made in the details of the illustrative embodiments without departing from the scope of the appended claims but within the spirit of the invention.

What I claim and desire to secure by Letters Patent is:

1. A choke valve, comprising, an elongated body, an axial bore therethrough, an axially bored cylindrical retainer member slidable in said bore, an axially bored cylindrical choke element co-axially inserted in the down-stream end of said retainer member and extending therefrom into the down-stream end of said axial bore in the body, abutment means in said down-stream end of said axial bore in the body to limit down-stream movement of said choke element and said retainer, spaced sealing means circumferentially disposed between said choke element and adjacent portions of said downstream end of said axial bore in the body and of the bore of said retainer member, an opening through the wall of said body communicating with its axial bore and dimensioned for passage therethrough of said choke element, and a sealing element circumferentially disposed between said retainer member and said axial bore in the body up-stream of said opening.

2. A choke valve, comprising, an elongated body, an axial bore therethrough having two successively reduced diameter portions toward its down-stream end forming axially spaced first and second annular shoulders in said axial bore, an axially bored cylindrical retainer member slidable in said bore relative to said first shoulder, an axially bored cylindrical choke element slidably insertable in the bore of said retainer member and extending therefrom into the first said portion of reduced diameter into contact with said second shoulder, spaced sealing elements circumferentially disposed between said choke element and adjacent portions of said axial bore and of the bore in said retainer element, an opening through the wall of said body communicating with said axial bore up-stream of said first shoulder and dimensioned for passage therethrough of said choke element, and a sealing element circumferentially disposed between said retainer member and said axial bore up-stream of said opening.

3. A choke valve, comprising, an elongated body, an axial bore therethrough, an axially bored cylindrical retainer member slidable in said axial bore, an axially bored cylindrical choke element slidably insertable in the downstream end of said retainer member and extending into said axial bore in the body, abutment means in said downstream end of said axial bore in the body to limit downstream movement therein of said choke element and said retainer member, spaced sealing elements circumferentially disposed between said choke element and adjacent portions of said axial bore in the body and of the bore of said retainer member, an opening through the wall of said body communicating with its axial bore and dimensioned for passage of said choke element therethrough, a sealing element circumferentially disposed between said retainer member and said axial bore in the body up-stream of said opening, passageways through the wall of said body communicating with the opposite ends of its axial bore, and means carried by the opposite ends of said body for connecting it into a fluid flow line.

4. A choke valve, comprising, an elongated body, an axial bore therethrough, an axially bored cylindrical retainer member slidable in said axial bore, an axially bored cylindrical choke element removably inserted in the down-stream end of said retainer member and extending therefrom into said axial bore in the body, abutment means in said axial bore in the body adapted to limit the down-stream movement therein of said choke element and said retainer member, spaced sealing elements arranged between said choke element and said axial bore in the body and between said retainer member and said axial bore in the body, and an opening through the wall of said body communicating with its axial bore between said sealing elements dimensioned for passage therethrough of said choke element.

5. A choke valve, comprising, an elongated body, an axial bore therethrough, an axially bored cylindrical retainer member slidable in said bore, an axial socket in the down-stream end of said retainer member, an axially bored cylindrical choke element removably inserted in said socket and extending therefrom into said axial bore in the body, sealing means disposed between said choke element and the wall of said socket, abutment means in said axial bore in the body adapted to limit the down-stream movement therein of said choke element and said retainer member, spaced sealing elements arranged between said choke element and said axial bore in the body and between said retainer member and said axial bore in the body, and an opening through the wall of said body communicating with its axial bore between said spaced sealing elements dimensioned for passage therethrough of said choke element.

ROBERT O. WALTON.

References Cited in the file of this patent

UNITED STATES PATENTS

| Number | Name | Date |
|---|---|---|
| 1,953,110 | Holtane | Apr. 3, 1934 |
| 1,971,159 | Laurent | Aug. 21, 1934 |
| 2,052,696 | Christensen | Sept. 1, 1936 |
| 2,372,408 | Trick | Mar. 27, 1945 |
| 2,407,050 | Allen et al. | Sept. 3, 1946 |
| 2,433,973 | Anderson | Jan. 6, 1948 |